(12) United States Patent
Vitebsky

(10) Patent No.: US 7,072,661 B2
(45) Date of Patent: Jul. 4, 2006

(54) WIRELESS COMMUNICATIONS SYSTEM AND RELATED METHODS FOR ALLOCATING DATA TRANSMISSION

(75) Inventor: Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 461 days.

(21) Appl. No.: 10/161,182

(22) Filed: Jun. 3, 2002

(65) Prior Publication Data
US 2004/0203822 A1    Oct. 14, 2004

(51) Int. Cl.
*H04Q 7/20* (2006.01)

(52) U.S. Cl. .................. 455/452.1; 455/450
(58) Field of Classification Search ........... 455/420, 455/450, 451, 452.1, 452.2, 456.6, 456.5, 455/464, 512, 453, 455; 370/337
See application file for complete search history.

(56) References Cited

U.S. PATENT DOCUMENTS

| | | | |
|---|---|---|---|
| 5,752,193 A * | 5/1998 | Scholefield et al. ...... 455/452.2 |
| 5,857,147 A * | 1/1999 | Gardner et al. .......... 455/67.11 |
| 6,674,765 B1 * | 1/2004 | Chuah et al. ............... 370/458 |
| 6,807,426 B1 * | 10/2004 | Pankaj ........................ 455/453 |
| 2002/0065082 A1 * | 5/2002 | Yegani et al. ............... 455/452 |
| 2003/0039213 A1 * | 2/2003 | Holtzman et al. .......... 370/252 |

* cited by examiner

*Primary Examiner*—Lester G. Kincaid
*Assistant Examiner*—Marivelisse Santiago-Cordero

(57) ABSTRACT

A communications system includes a base station and a plurality of remote stations wirelessly communicating with the base station and transmitting a requested service rate to the base station. The base station allocates a next transmission of data to the remote stations based on a scheduling operation. The scheduling operation includes determining an average service rate for each remote station and determining a priority value for each remote station based on the requested service rate and average service rate. In allocating the next transmission of data, at least one of the average service rate and the priority value is modified to thereby control data throughput of the communications system.

14 Claims, 8 Drawing Sheets

WIRELESS COMMUNICATIONS SYSTEM AND RELATED METHODS FOR ALLOCATING DATA TRANSMISSION

FIELD OF THE INVENTION

The present invention relates to communications systems and, more particularly, to wireless communications systems.

BACKGROUND OF THE INVENTION

Wireless communication is commonly carried out over a network or system that, in general, can be characterized as having a base station and a plurality of remote stations that communicate wirelessly with the base station. Although a wireless communication system is not constrained by the need for wired connections, the system nevertheless does face resource constraints in supporting the wireless communications of the plurality of remote stations. A wireless system transmits data over channels within a band of frequencies (i.e., bandwidth). A wireless frequency band has a limited amount of bandwidth, however. Accordingly, some manner of allocating resources among the plurality of remote stations is needed if the system is to transmit data efficiently.

Efficient data transmission requires not only that resources be allocated among the plurality of remote stations, but also that transmissions be scheduled so as to address another physical limitation to wireless communication: signal fading. Signal fading impedes transmission and stems from at least two sources, namely, obstacles near a station that is receiving transmission (i.e., shadowing fading) and the cumulative effect due to scatters, reflectors and diffractors surrounding a station that is receiving or transmitting (i.e., multi-path fading).

So-called "opportunistic communication" turns the limitation of signal fading into an opportunity by always serving the remote station with the strongest channel, diverting bandwidth if the channel is fading. To exploit changing channel fading conditions, each remote station measures its signal strength and transmits that information to the base station. The base station allocates available resources according to a scheduling algorithm based on this transmitted information.

Over time, though, resources should be allocated so that no one station continuously receives all the resources. One approach, therefore, is to allocate communication resources on the basis of a so-called proportional fair algorithm. Such an algorithm is intended to allocate communication resources among multiple users more fairly than would a simple first-come-first-served queuing algorithm. A fair algorithm has also been shown to more efficiently utilize fading channel variations at a mobile receiver.

Such allocations, however, do not provide providers of wireless communication services with sufficient control over data transmission to meet all service provider requirements. There remains, for example, the problem of constraining the data throughput of those users that put excessive demands on a wireless communications network. There is also the problem of differentiating among users on the basis of the nature of the application for which each user is utilizing the network. Further, there is the problem of differentiating among network users on the basis of individual users' payment plans. Conventional schemes for allocating the transmission of data do not adequately address these and other service provider requirements.

SUMMARY OF THE INVENTION

In view of the foregoing background, it is therefore an object of the present invention to provide for a fair allocation of transmission data while accommodating diverse service provider requirements.

This and other objects, features, and advantages in accordance with the present invention are provided by a communications system and related methods that allocate transmission of data according to a comparison of modified priority values or average service rates determined for each service requester. The system may include a base station comprising a plurality of transceivers connected to an antenna and under the control of controller for implementing a scheduler operation. The system may also include a plurality of remote stations that wirelessly communicate with the base station, each remote station transmitting a request for a service rate to the base station and comprising a transceiver connected to an antenna and operated by a controller. The base station may respond to these service rate requests by allocating a next transmission of data based on the scheduling operation implemented by the controller.

The scheduling operation may include determining an average service rate for each remote station as well as a priority value for each remote station. Each remote station's priority value may be based on its requested service rate and its average service rate. The scheduling operation may further include modifying at least one of the average service rate and the priority value for at least one of the remote stations to thereby control the data throughput of the communication system.

In addition, the scheduling operation may also include determining which remote station has a highest modified priority value. The next transmission of data may then be allocated on the basis of the highest modified priority value. Specifically, the next transmission of data may be allocated to the remote station determined to have the highest modified priority value.

According to one embodiment of the invention, the system may modify the priority value of at least one remote station by lowering the priority value if the requested service rate of the remote station is higher than others and raising the priority value if the requested service rate is lower than others. For example, the priority value may be multiplied by a factor that varies inversely with the requested service rate. Accordingly, the system may modify the priority value of at least one remote station so that the effect of a high requested service rate on the priority value is dampened and the effect of a low requested service rate is enhanced.

The system, in another embodiment, may modify the priority value of at least one remote station so as to raise the priority value of the remote station if its average service rate is lower than the average service rate of others and lower the priority value if its average service rate is higher than others. Modifying a priority value, therefore, may include multiplying the priority value by a factor that varies inversely with the average service rate.

Additionally, according to yet a further embodiment, the system may further modify the priority value of at least one remote station based upon at least one quality-of-service (QoS) parameter. The QoS parameter may be selected to take account of the payment scheme under which a user of the remote station pays a service provider that may own and operate the communications system. Alternately, or in addition thereto, the modification may be based on a QoS parameter reflecting the type of application the user wishes run on the system.

In a further embodiment of the invention, the system may determine a modified average service rate based on the average service rate of at least one remote station. With respect to determination of a modified average service rate for an n-th time slot, the modified average service rate may be based on an average service rate over each of the n−1 earlier time slots and at least one additional, modifying factor. A priority value may then be determined based on the modified average service rate.

The system may also select only some remote stations for consideration in allocating a next transmission of data. The selection may be based on the average service rate of each remote station. The selection, more specifically, may be based on a comparison of each remote station's average service rate with a threshold. If the average service rate is less than the threshold, the remote station is considered for allocation of the next transmission of data. Whether the next transmission of data is allocated to the remote station under consideration may be determined on the basis of a priority value either modified or based on a modified average service rate as already described.

The threshold itself may be fixed or, alternately, may be based on the total number of remote stations of the system. Moreover, the threshold may alternately be based on an average of all remote station average service rates.

A further aspect of the invention pertains to a method of allocating a next transmission of data in a communications system comprising a base station and a plurality of remote stations wirelessly communicating with the base station. The method may include determining an average service rate and a priority value for each remote station, each remote station's priority value being based on both its average service rate and a service rate requested by the remote station. The method may also include modifying at least one of the average service rate and the priority rate of at least one of the remote stations.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notation indicates similar elements in alternate embodiments.

Figure 1:
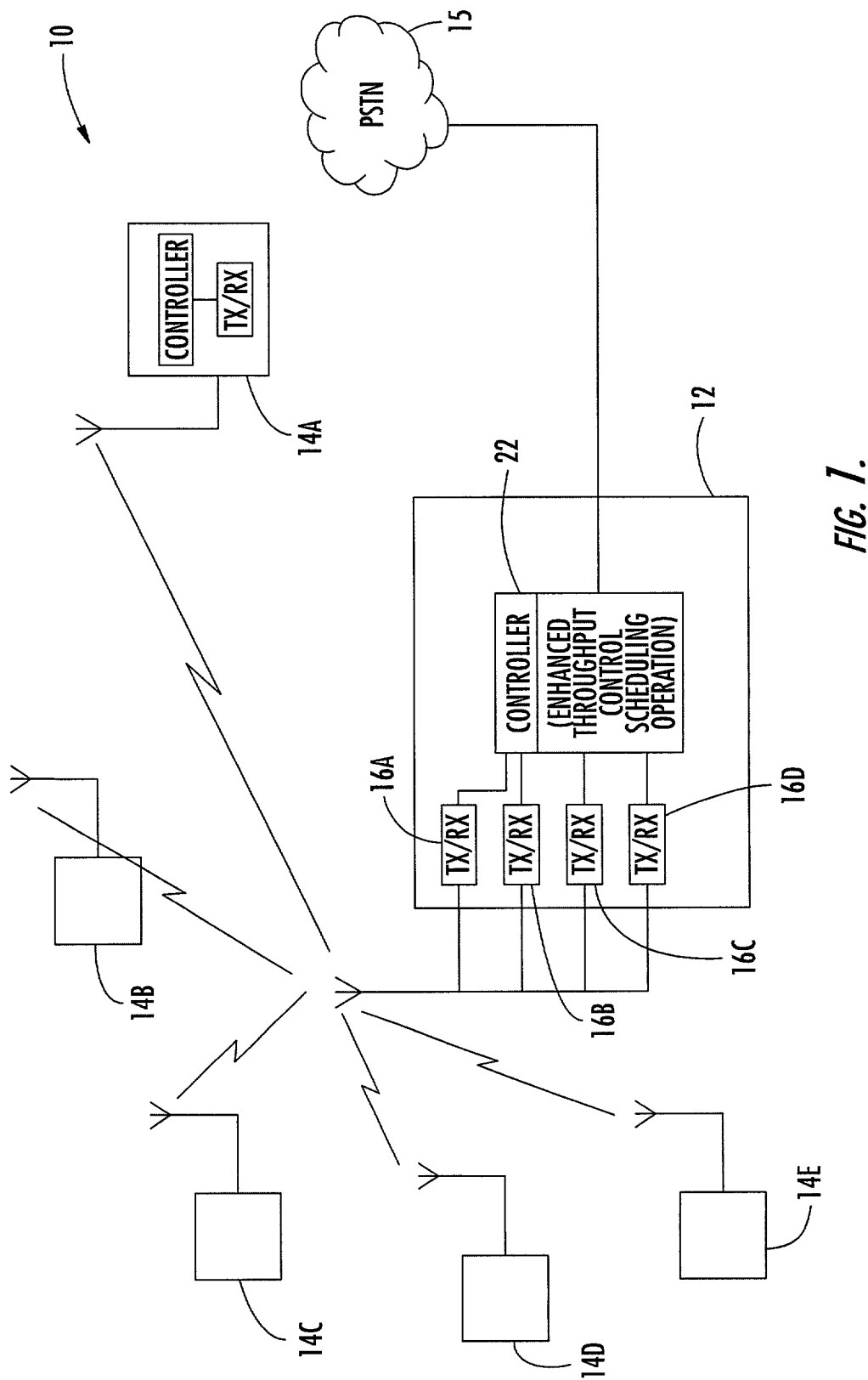
FIG. 1 is a schematic block diagram of a communication system in accordance with the invention.
Figure 2:
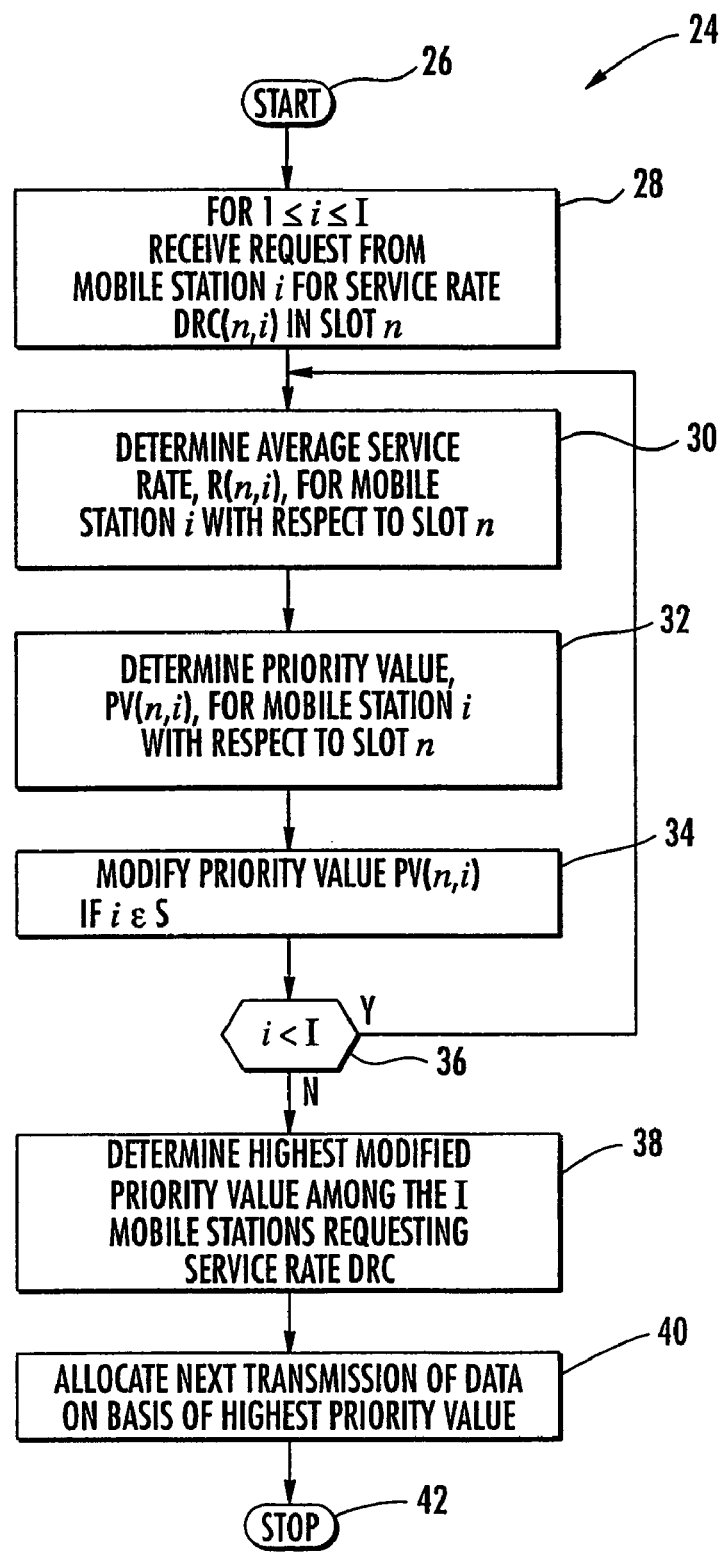
FIG. 2 is a flow chart of the steps performed by the communication system of FIG. 1.

Referring initially to FIGS. 1 and 2, a communications system 10 according to the invention is described. The communications system 10 includes a base station 12 and a plurality of remote stations 14A–14E, each of which communicates wirelessly with the base station. The base station 12, moreover, also illustratively communicates with a public switched telephone network (PSTN) 15. The base station 12 illustratively comprises a plurality of transceivers 16A–16D, an antenna connected to each transceiver, and a controller 22 connected with and controlling each of the transceivers. The remote stations 14A–14E are identical or substantially similar to one another. It suffices, therefore, to describe a single remote station 14a, which illustratively comprises a transceiver 24, an antenna 28 connected thereto, and a controller 30 also connected to the transceiver.

Each of the plurality of remote stations 14A–14E communicates with the base station 12 and transmits thereto a requested service rate $DRC(n, i)$, n representing the n-th time slot for a transmission of data and i indicating the remote station transmitting the requested service rate. The base station 12 allocates a next transmission of data in the n-th time slot. The allocation is made according to a scheduling operation that provides for enhanced throughput control and that can be implemented by the controller 22.

The scheduling operation is illustrated by flow chart 24. After the start (Block 26), at least one remote station 14A–14E transmits a requested service rate that is received by the base station 12 at Block 28. According to the scheduling operation, an average service rate $R(n, i)$ is determined at Block 30 for the i-th remote station with respect to the n-th slot (i.e., the time slot to be allocated for the next transmission of data). On the basis of the requested service rate, $DRC(n, i)$, and the average service rate $R(n, i)$, a priority value $PV(n, i)$ is determined for the i-th remote station (Block 32) for the n-th slot.

To enhance throughput control, the priority value of at least one of the remote stations 14A–14E is modified. Accordingly, for the i-th mobile station, the priority value, $PV(n, i)$, is modified at Block 34 if the i-th remote station is among a set S of at least one remote station whose priority value is to be modified. The steps are repeated at Block 36 for each mobile station transmitting a requested service rate to the base station 12. Therefore, the priority value of at least one of the remote stations 14A–14E will be modified.

For each remote station, a determination as to which remote station has the highest priority value is made at Block 38. The next transmission of data is allocated on the basis of the highest priority value as determined according to the scheduling operation (Block 40), upon which the scheduling operation is complete at Block 42.

Figure 3:
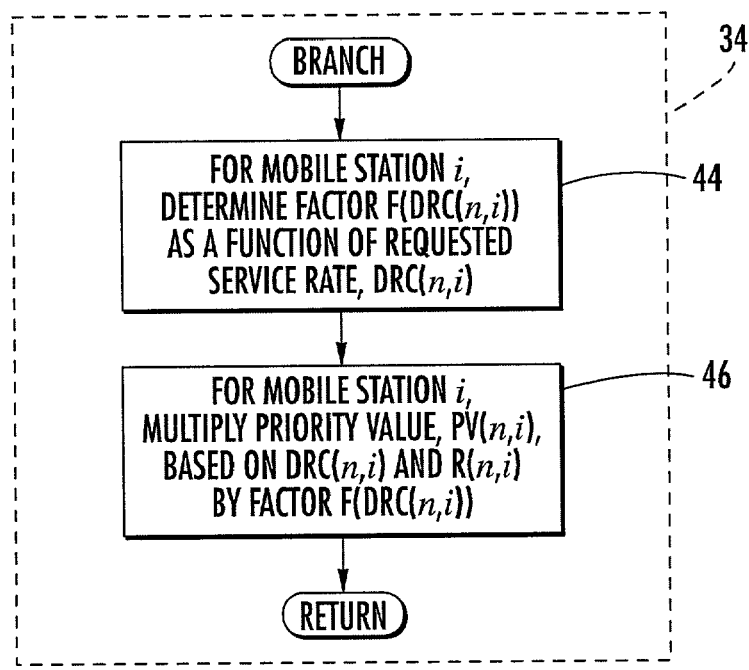
FIG. 3 is a flow chart of the steps performed by the communication system of FIG. 1 in accordance with an alternate embodiment of a portion of the flow chart of FIG. 2.

Referring now additionally to FIG. 3, one embodiment of the system's modifying the priority value PV(n, i) at Block 34 of flow chart 24 is described. According to the embodiment, a priority value for the i-th mobile station is modified on the basis of the requested service rate, DRC(n, i), of the i-th remote station. According to this embodiment, modifying the priority value PV(n, i) comprises determining at Block 44 a factor, F(DRC(n, i)), which is a function of the requested service rate, DRC(n, i). The priority value, PV(n, i), is itself based on the requested service rate, DRC(n, i) as well as the average service rate R(n, i) of the i-th mobile station (e.g., as the ratio DRC(n, i)/R(n, i)).

At Block 46, the priority value PV(n, i) is modified by multiplying the priority value by the factor F(DRC(n, i)). This provides a direct and efficient way of modifying the priority value. For example, if the factor varies inversely to the requested service rate (e.g., [dF(DRC(n, i))]/dDRC(n, i)]<0 if F is continuous), then the result of the modification is to dampen the effect of a high requested service rate and to enhance the effect of a low service rate.

As will be readily apparent to those skilled in the art, there are other multiplication factors based either on continuous or discrete functions that alternately can be used to raise or lower the priority value. Moreover, as will also be readily appreciated by those skilled in the art, the system 10 alternately can employ one or more factors stored, for example, in a look-up table, to raise or lower a priority value according to whether the requested service rate is lower or higher than others.

Such modifying is advantageous, for example, when some remote stations consistently request higher service rates than others. A consistently higher requested service rate might, for example, reflect a mobile station's more favorable transmitting and/or receiving conditions due perhaps to better radio frequency (RF) conditions associated with the mobile station. By dampening the effect of higher requested service rates, the system achieves a smaller ratio between throughputs achievable by remote stations under favorable conditions versus those under less favorable conditions.

Figure 4:
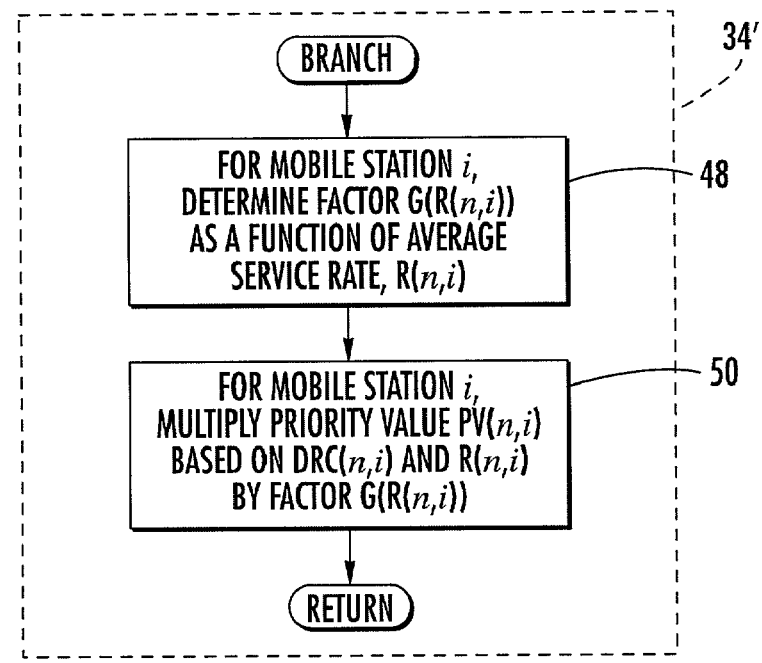
FIG. 4 is a flow chart of the steps performed by the communication system of FIG. 1 in accordance with another alternate embodiment of a portion of the flow chart of FIG. 2.

In yet another embodiment, the communications system 10 modifies the priority value PV(n, i) of the i-th mobile station on the basis of the average service rate R(n, i) of the station. This embodiment of modifying the priority value is now described with specific reference to FIG. 4. Modifying the priority value, PV(n, i), comprises determining a factor, R(R(n, i)), at Block 48, wherein G is a function of the average service rate, R(n, i). The priority value, PV(n, i) is, again, illustratively based on the requested service rate, DRC(n, i) and the average service rate R(n, i) of the i-th mobile station. At Block 50, the priority value is modified by multiplying the priority value by the factor G(R(n, i)).

Therefore, if the factor varies inversely to the average service rate (e.g., [dG(R(n, i))]/dR(n, i)]<0 if G is continuous), multiplying the priority value PV(n, i) by the factor G(R(n, i) lowers the priority value when the average service rate is higher than others and raises the priority value when the average service rate is lower than others. Again, it will be readily apparent to those skilled in the art that there are other multiplication factors, based on continuous or discrete functions, which can be employed to lower the priority value if the requested service rate is higher and to raise the priority value if the requested service rate is lower.

More generally, these factors can be employed, for example, to skew modified priority values in favor of remote stations that have previously been allocated lower service rates and against those that previously have been allocated higher service rates. It will also be readily appreciated by those skilled in the art, the system 10 alternately can employ one or more factors stored, for example, in a look-up table, to raise or lower a priority value according to whether the requested service rate is lower or higher than others.

Figure 5A:
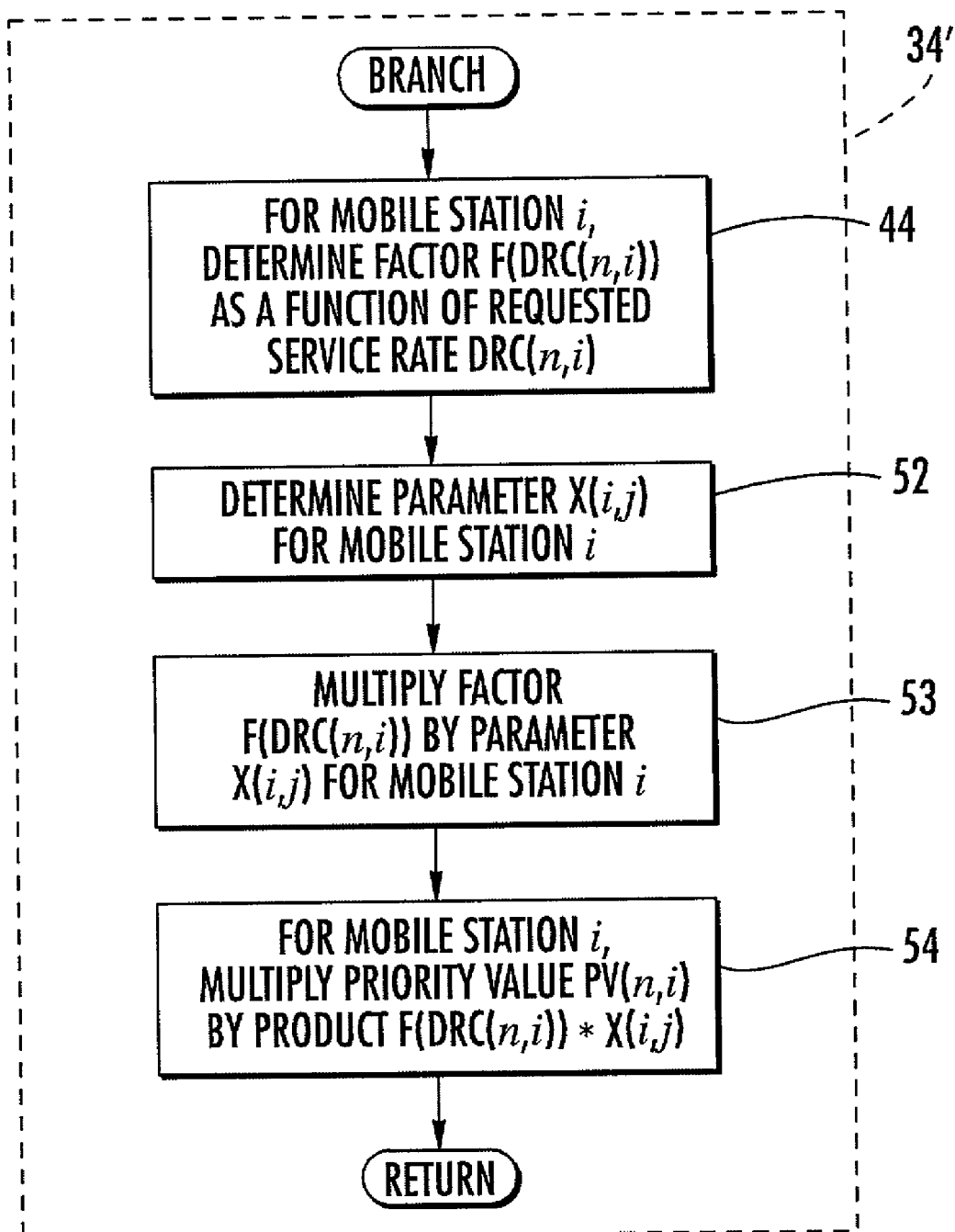
FIG. 5A is a flow chart of the steps performed by the communication system of FIG. 1 in accordance with still another alternate embodiment of a portion of the flow chart of FIG. 2.

In still further embodiments, a priority value PV(n, i) of at least one remote station 14A–14E of the communications system 10 can be additionally modified by a QoS parameter. According to one embodiment illustrated in FIG. 5A, at Block 34' the factor F(DRC(n, i)) is determined as previously described (Block 44). Additionally, a QoS parameter, X(i, j), is determined for the i-th remote station with respect to the n-th slot at Block 52. The factor F(DRC(n, i)) is then illustratively modified by multiplying it by the parameter X(i, j) at Block 53. At Block 54, the priority value PV(n, i) of the i-th remote station is multiplied by the product of the factor F(DRC(n, i)) and the QoS parameter, X(i, j), to thereby obtain a priority value modified by both the factor based on the requested service rate and the QoS parameter.

Figure 5B:
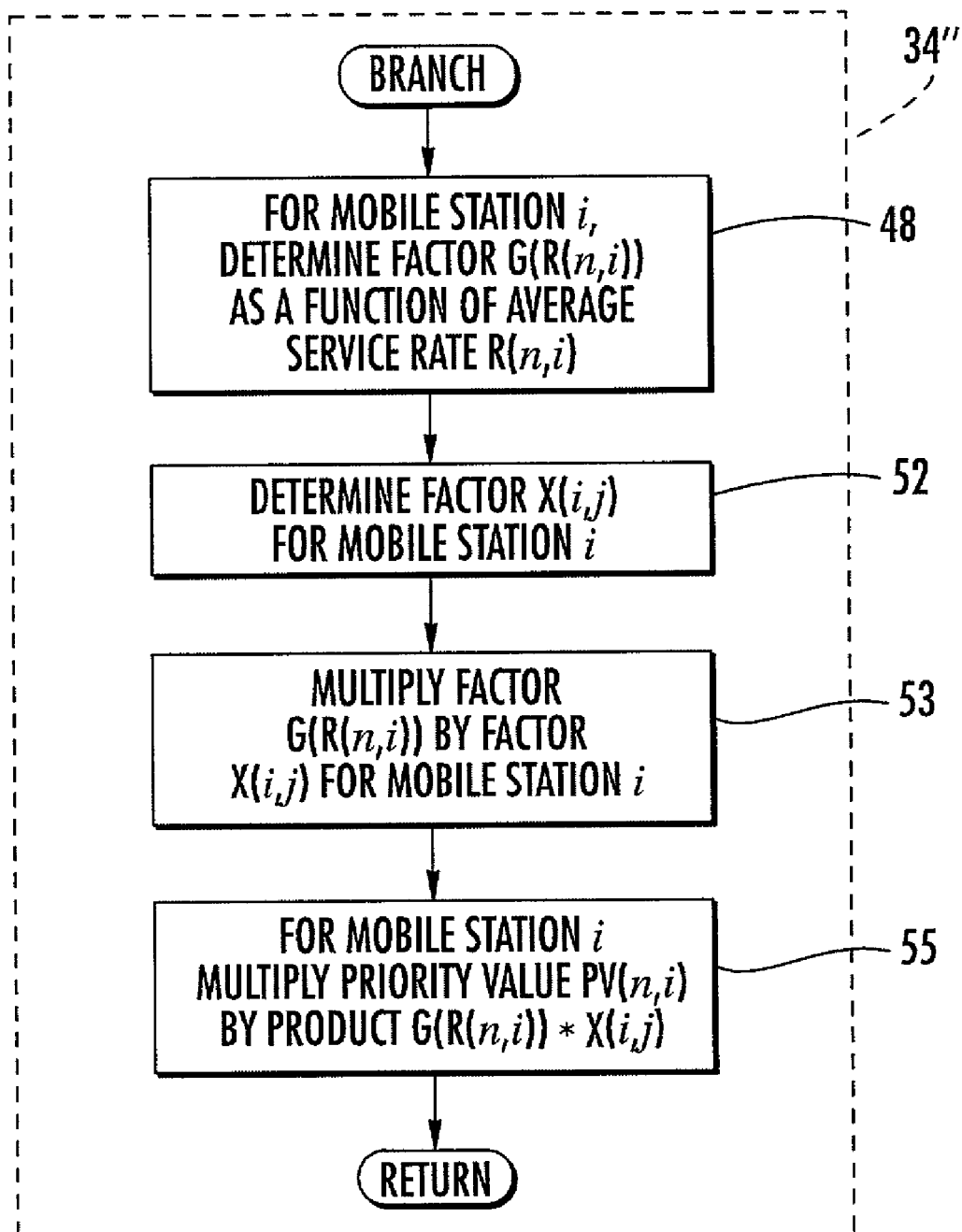
FIG. 5B is a flow chart of the steps performed by the communication system of FIG. 1 in accordance with yet another alternate embodiment of a portion of the flow chart of FIG. 2.

In an alternate embodiment illustrated in FIG. 5B, at Block 34" the factor G(R(n, i) is determined as previously described (Block 48), and the QoS parameter, X(i, j), is determined for the i-th remote station with respect to the n-th slot at Block 52 as also previously described. The QoS parameter is used then to modify the factor R(n, i) by illustratively obtaining the product of the parameter and the factor, namely, R(n, i)*X(i, j) at Block 53. The product so obtained in used to modify the priority value PV(n, i) of the i-th remote station at Block 55 by multiplying the priority value by the product of the factor R(n, i) and the QoS parameter, X(i, j). Accordingly, the priority value is modified by both the factor based on the average service rate and the QoS parameter.

As will be readily appreciated by those skilled in the art, the QoS parameter, X(i, j), for example, can be based on the payment scheme under which the base station 12 services the remote station, i. Thus, for example, j may indicate one of several distinct classes based on payment scheme. The parameter X(i, j), therefore, can be selected so a remote station under a preferred payment scheme has its priority value raised when modified by the parameter.

Alternately, the QoS parameter, X(i, j), can correspond to a priority class assigned to the i-th station. Still, moreover, the QoS parameter, X(i, j), can be based on the application for which the i-th remote station is requesting a service rate, DRC(n, i), in the n-th slot. Thus, for example, with respect to X(i, j), j may indicate one of several distinct applications to be run in the n-th slot by remote station i.

Figure 6:
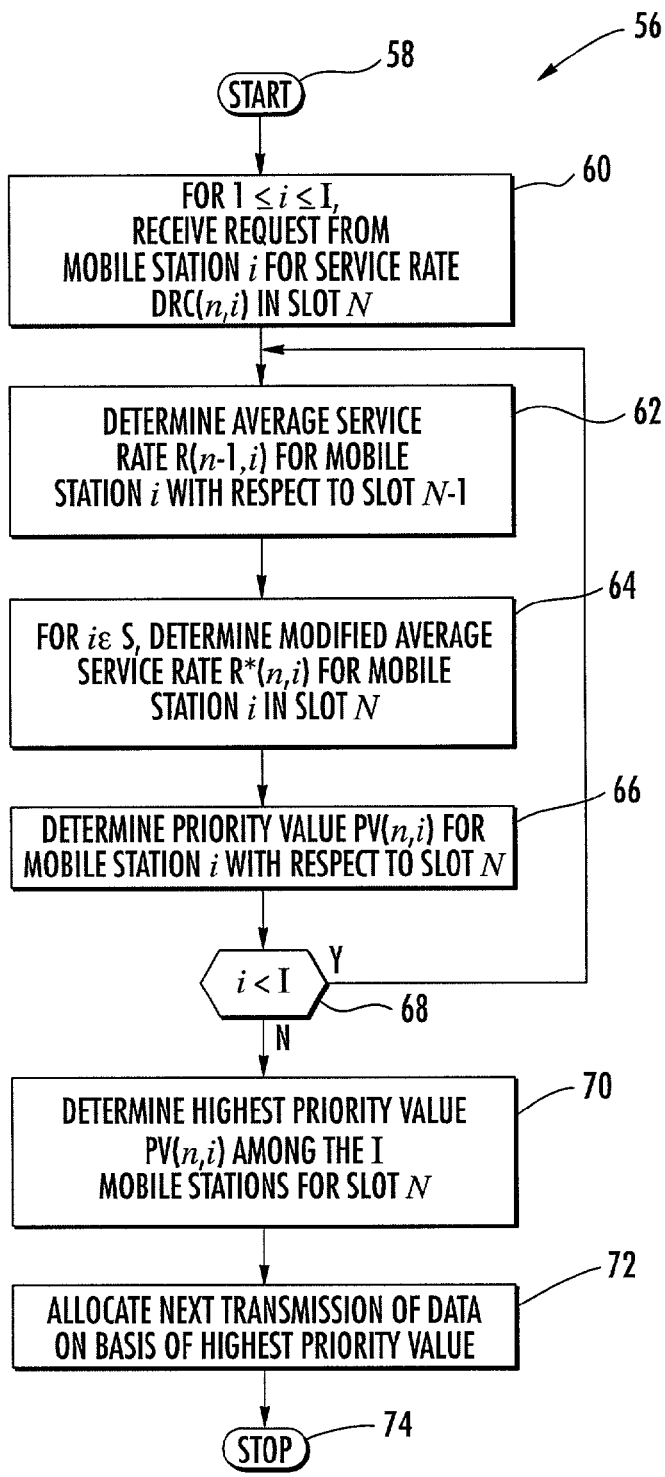
FIG. 6 is a flow chart of the steps performed by the communication system of FIG. 1 in accordance with another embodiment of the invention.
Figure 7:
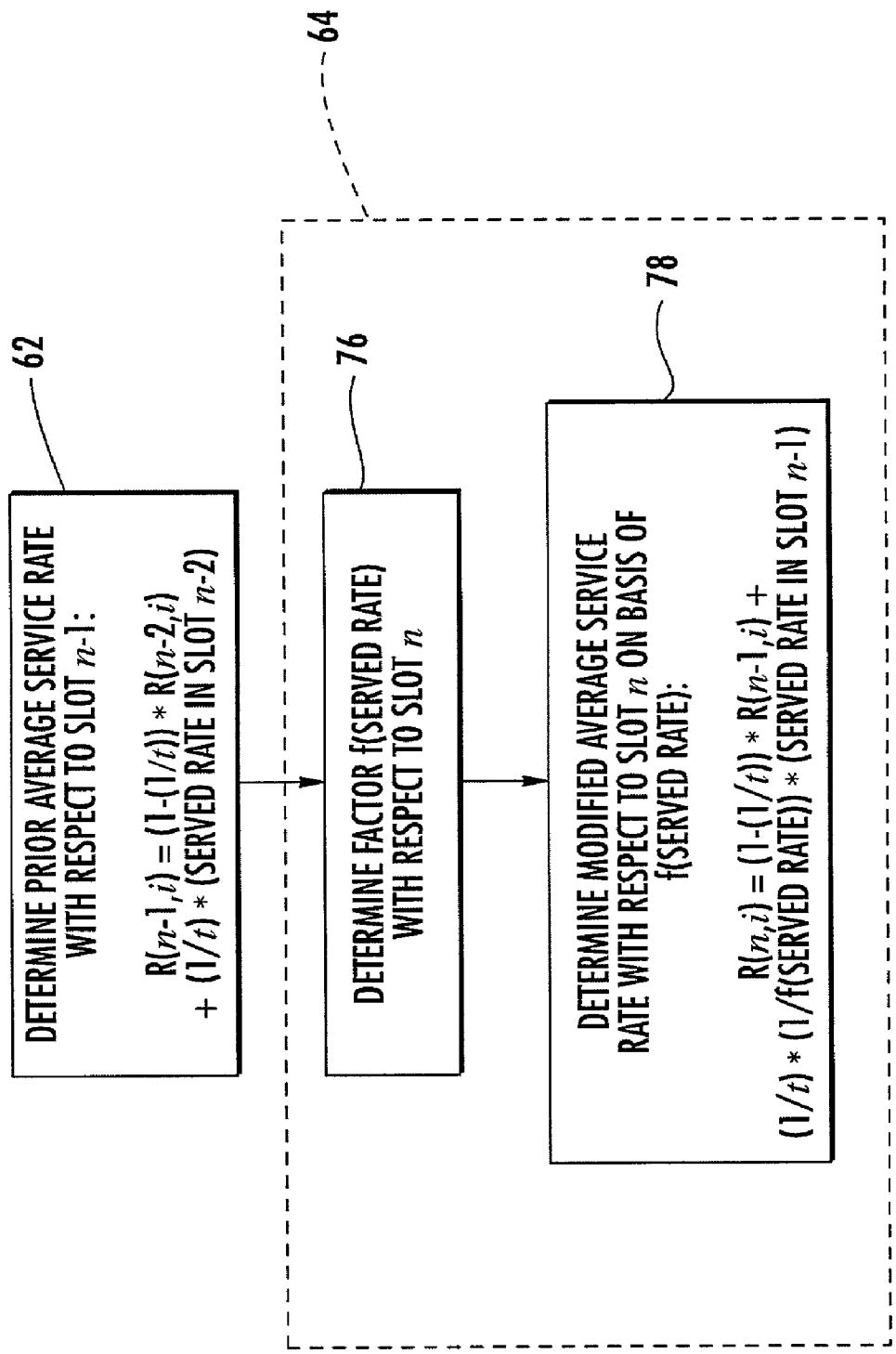
FIG. 7 is a flow chart of the steps performed by the communication system of FIG. 1 in accordance with an alternate embodiment of a portion of the flow chart of FIG. 6.

In yet another alternative embodiment, illustrated in FIGS. 6 and 7, the priority value PV(n, i) for the i-th mobile station is determined on the basis of a modified average service rate, R*(n, i). The priority value, as already noted, can be determined as a ratio of a requested service rate to an average service rate. Therefore, through modification of the average service rate, the communications system 10 can accordingly influence the priority value. The embodiment is described in terms of the flow chart 56 in which, after the start (Block 58), the base station 12 receives at Block 60 a request for service rate DRC(n, i) from the i-th station for the n-th slot. At Block 62, the average service rate for service up to the next to last slot is computed (i.e., R(n−1, i). A modified average service rate is then computed at Block 64 based on R(n−1, i) and an additional factor described in more detail as follows.

In general, an average service rate R(n, i) for the i-th remote station in the n-th time slot can be calculated according to the following equation: $R(n, i)=(1-(1/t))*R(n-1,i)+(1/t)*$(served rate in slot n−1 for user i), where t is the number of slots in a time window used for averaging. This formula is used at Block 62 to compute, R(n−1, i), the average service rate with respect to the n−1 slot: $R(n-1, i)=(1-(1/t))*R(n-2,i)+(1/t)*$(served rate in slot n−2 for user i). The modified average service rate is then computed in Blocks 76 and 78.

At Block 76, the additional factor f is illustratively determined based on a past served rate determined over the averaging window (e.g., f(R(n, i))). At Block 78, the modified average service rate, R*(n, i), with respect to slot n is then determined based on the additional factor and R(n−1, i): $R*(n, i)=(1-(1/t))*R(n-1,i)+(1/t)*(1/f$(served rate))(served rate in slot n−1 for user i). The additional factor f can be chosen so that R*(n, i) is higher or lower according to whether the service rate of the i-th remote station has been higher or lower than others in the past. The choice will have the effect of raising or lowering the priority value according to whether the f varies directly or inversely with the service rate. The additional factor f also can be further modified by a QoS parameter as described above.

Figure 8:
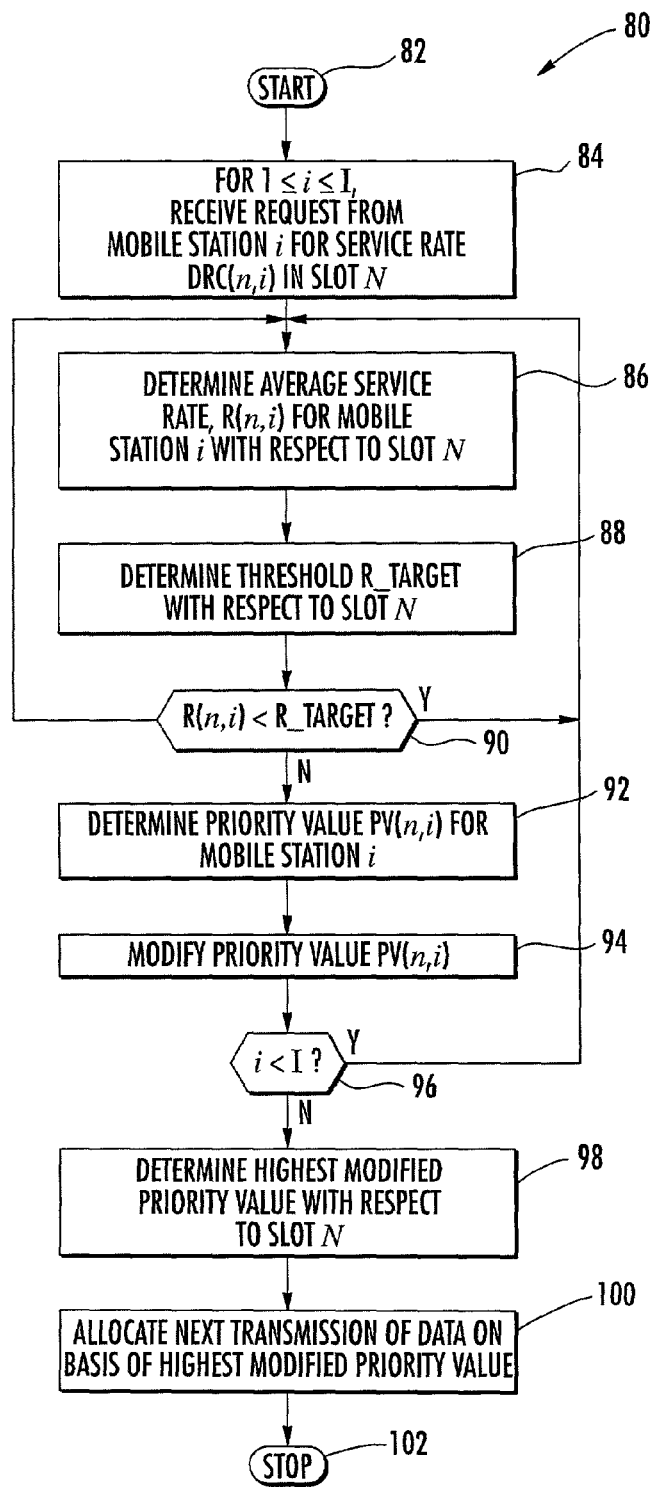
FIG. 8 is a flow of the performed by the communication system of FIG. 1 in accordance with yet another embodiment of the invention.

In yet a further embodiment, only those remote stations in the communications system 10 meeting a threshold condition are eligible for allocation of the next transmission of data. Allocation proceeds according to the flow chart 80 illustrated in FIG. 8. After the start (Block 82), a request for service from the i-th remote station is received by the base station 12 (Block 84). The average service rate R(n, i) for the i-th station is determined at Block 86. At Block 88, a threshold, R_target, is determined and at Block 90 the average service rate and threshold are compared. Only if the average service rate is less than the threshold will the remote station be determined to be eligible for allocation of the next transmission of data. For each remote station determined to be eligible, a priority value PV(n, i) can be determined and modified (Blocks 92–98). Accordingly, the next transmission of data can be allocated at Block 100 based on the modified highest priority value, after which the scheduling operation is complete (Block 102).

It is to be noted that the average service rate R(n, i) can be updated for every remote station even if a remote station is excluded for consideration in the n-th slot. Therefore, for such an excluded remote station, the average service rate, R(n, i), decreases from slot to slot if the earlier described formula is used in determining the average service rate. Thus, over time the excluded remote station has an improved likelihood of being considered.

It is also to be noted that the threshold can also be based on the total number of remote stations. Thus, for example, if the threshold is selected so as to vary inversely with the number of users, there is accordingly a greater likelihood a remote station will be considered the more remote stations in the communications system 10.

The threshold can also be based on an average of all remote station average service rates. For example, R_target can be computed as the summation of all average service rates over i divided by the total number, N, of remote stations: R_target=[ΣR(n, i)]/N. Alternately, or additionally, the threshold can be made to vary according to a QoS parameter. As already described, the QoS parameter may relate to the payment scheme under which service is provided to a remote station, or, the application to be run on the remote station.

Moreover, the threshold can be modified so as to take account of factors such as the transmission condition (e.g., RF condition) of each remote station. For example, a modified threshold can be obtained by multiplying R_target by a factor K. If K is large compared to 1, for example, then remote stations benefiting from better transmitting conditions are allocated greater throughput on average than other remote stations. Thus, modifying the threshold by K has the effect of skewing the threshold in favor of remote stations that have the benefit of transmitting conditions that are better than other remote stations.

An additional aspect of the invention pertains to a method of allocating transmission of data in a communications system 10 comprising a base station 12 and a plurality of remote stations 14A–14E, each wirelessly communicating with the base station and transmitting thereto a requested service rate. According to the method, a next transmission of data is allocated by determining an average service rate for each remote station 14A–14E. On the basis of the average service rate and requested service rate, a priority value is determined. In addition, the method includes modifying at least one of the average service rate and the priority value for at least one remote station 14A–14E. The method further includes allocating the next transmission on the basis of either a modified priority value or, alternately, on a priority value based on a modified average service rate.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A base station for communicating with remote stations and comprising:
    a controller allocating a next transmission of data among the remote stations based on a scheduling operation by
        determining an average service rate for each remote station;
        determining a priority value for each remote station based upon a requested service rate and the average service rate, and
        modifying at least the priority value for at least one remote station by multiplying the determined priority value by a factor that comprises a function of the requested service rate for the one remote station to thereby control data throughput.

2. A base station according to claim 1 wherein modifying comprises lowering the priority value if the requested service rate is higher than at least one other and raising the priority value if the requested service rate is lower than at least one other.

3. A base station according to claim 1 wherein the factor varies inversely to the requested service rate so as to dampen the effect of a high requested service rate and enhance the effect of a low requested service rate.

4. A base station according to claim 1 wherein modifying comprises modifying based on the average service rate of the at last one remote station.

5. A base station according to claim 1 comprising modifying based upon at least one quality-of-service (QoS) parameter.

6. A base station according to claim 1 wherein the modifying is performed for at least one remote station having an average service rate below a threshold.

7. A base station according to claim 6 wherein the threshold is based on a plurality of remote station average service rates.

8. A base station according to claim 1 wherein the base station allocates the next transmission of data to a remote station having a highest priority value after performing the modifying.

9. A base station according to claim 1 wherein the base station comprises at least one transceiver for receiving the requested service rate of each remote station.

10. A method of allocating a next transmission of data associated with a communications system comprising a base station and a plurality of remote stations wirelessly communicating with the base station and transmitting thereto a requested service rate, the method comprising:

determining an average service rate for each remote station;

determining a priority value for each remote station based upon the requested service rate and the average service rate; and modifying at least the priority value for at least one of the remote stations by multiplying the determined priority value by a factor comprising a function of the requested service rate for the one remote station.

11. A method according to claim 10 comprising lowering the priority value if the requested service rate is higher than at least one other and raising the priority value if the requested service rate is lower than at least one other.

12. A method according to claim 10 wherein modifying comprises further modifying based upon at least one quality-of-service (QoS) parameter.

13. A method according to claim 10 wherein modifying is performed for at least one remote station having an average service rate below a threshold.

14. A method according to claim 10 wherein the function of the requested service rate renders the factor inversely proportional to the requested service rate.

* * * * *